United States Patent
Vaswani et al.

(10) Patent No.: US 7,926,043 B2
(45) Date of Patent: Apr. 12, 2011

(54) DATA STRUCTURE PATH PROFILING

(75) Inventors: Kapil Vaswani, Gujarat (IN); Trishul Chilimbi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1331 days.

(21) Appl. No.: 11/425,354

(22) Filed: Jun. 20, 2006

(65) Prior Publication Data
US 2008/0005208 A1 Jan. 3, 2008

(51) Int. Cl.
*G06F 9/44* (2006.01)
*G06F 9/45* (2006.01)

(52) U.S. Cl. ........ 717/130; 717/133; 717/153; 717/157; 717/158

(58) Field of Classification Search .......... None
See application file for complete search history.

(56) References Cited

U.S. PATENT DOCUMENTS

| | | | |
|---|---|---|---|
| 4,862,373 A * | 8/1989 | Meng ............... 701/209 |
| 5,220,667 A | 6/1993 | Ichieda |
| 5,333,311 A | 7/1994 | Whipple, II |
| 5,713,008 A | 1/1998 | Falkner |
| 5,740,443 A | 4/1998 | Carini |
| 5,774,685 A | 6/1998 | Dubey |
| 5,815,720 A | 9/1998 | Buzbee |
| 5,909,578 A | 6/1999 | Buzbee |
| 5,925,100 A | 7/1999 | Drewry et al. |
| 5,940,618 A | 8/1999 | Urquhart et al. |
| 5,950,003 A * | 9/1999 | Kaneshiro et al. ........ 717/130 |
| 5,950,007 A | 9/1999 | Nishiyama et al. |
| 5,953,524 A | 9/1999 | Meng et al. |
| 5,960,198 A | 9/1999 | Roediger et al. |
| 6,026,234 A | 2/2000 | Hanson et al. |
| 6,073,232 A | 6/2000 | Kroeker et al. |
| 6,079,032 A | 6/2000 | Peri |
| 6,145,121 A | 11/2000 | Levy et al. |
| 6,148,437 A | 11/2000 | Shah et al. |
| 6,189,036 B1 * | 2/2001 | Kao ............... 709/229 |
| 6,216,219 B1 | 4/2001 | Cai et al. |
| 6,233,678 B1 | 5/2001 | Bala |
| 6,311,260 B1 | 10/2001 | Stone et al. |
| 6,321,240 B1 | 11/2001 | Chilimbi et al. |
| 6,330,556 B1 | 12/2001 | Chilimbi et al. |
| 6,360,361 B1 | 3/2002 | Larus et al. |
| 6,370,684 B1 | 4/2002 | De Pauw et al. |
| 6,381,735 B1 * | 4/2002 | Hunt ............... 717/158 |
| 6,404,455 B1 | 6/2002 | Ito et al. |

(Continued)

OTHER PUBLICATIONS

Trishul Chilimbi, *Efficient Representations and Abstractions for Quantifying and Exploiting Data Reference Locality*, Symposium of Programming Languages Design and Implementation, 2001, 12 pages.

(Continued)

*Primary Examiner* — Tuan Q Dam
*Assistant Examiner* — Zheng Wei
(74) *Attorney, Agent, or Firm* — Klarquist Sparkman, LLP

(57) ABSTRACT

The described technology provides data structure path profiling. An instrumented version of a program is created that calls a profiler runtime when pointer based data structures are allocated or accessed via pointers. A model of the heap is created and nodes in the model data structures are assigned unique identifiers. Paths traversed through the model data structures are assigned unique identifiers. The paths are counted in order to identify paths through the data structure model that are traversed frequently. The model is useful for providing information about high frequency data paths to the program developer and for various optimization purposes, such as prefetching and or increasing data locality during garbage collection.

20 Claims, 6 Drawing Sheets

US 7,926,043 B2
Page 2

U.S. PATENT DOCUMENTS

| | | |
|---|---|---|
| 6,446,257 B1 | 9/2002 | Pradhan et al. |
| 6,560,693 B1 | 5/2003 | Puzak et al. |
| 6,560,773 B1 * | 5/2003 | Alexander et al. ............ 717/128 |
| 6,571,318 B1 | 5/2003 | Sander et al. |
| 6,598,141 B1 | 7/2003 | Dussud et al. |
| 6,628,835 B1 | 9/2003 | Brill et al. |
| 6,651,243 B1 | 11/2003 | Berry et al. |
| 6,658,652 B1 * | 12/2003 | Alexander et al. ............ 717/128 |
| 6,675,374 B2 | 1/2004 | Pieper et al. |
| 6,704,860 B1 | 3/2004 | Moore |
| 6,738,968 B1 | 5/2004 | Bosworth et al. |
| 6,848,029 B2 | 1/2005 | Coldewey |
| 6,886,167 B1 | 4/2005 | Breslau et al. |
| 6,904,590 B2 | 6/2005 | Ball et al. |
| 6,951,015 B2 | 9/2005 | Thompson |
| 6,957,422 B2 * | 10/2005 | Hunt ............................ 717/130 |
| 7,032,217 B2 * | 4/2006 | Wu ............................... 717/158 |
| 7,058,936 B2 | 6/2006 | Chilimbi et al. |
| 7,140,008 B2 | 11/2006 | Chilimbi et al. |
| 7,159,038 B2 * | 1/2007 | Rychlicki ..................... 709/245 |
| 7,181,730 B2 | 2/2007 | Pitsianis et al. |
| 7,293,260 B1 * | 11/2007 | Dmitriev ....................... 717/130 |
| 7,296,180 B1 | 11/2007 | Waterhouse et al. |
| 7,343,598 B2 * | 3/2008 | Chilimbi et al. ............. 717/158 |
| 7,401,324 B1 * | 7/2008 | Dmitriev ....................... 717/130 |
| 7,506,317 B2 * | 3/2009 | Liang et al. ................... 717/130 |
| 7,587,709 B2 | 9/2009 | Chilimbi et al. |
| 7,607,119 B2 | 10/2009 | Perelman et al. |
| 7,770,153 B2 | 8/2010 | Chilimbi et al. |
| 2002/0133639 A1 | 9/2002 | Breslau et al. |
| 2002/0144245 A1 | 10/2002 | Lueh |
| 2002/0178401 A1 | 11/2002 | Ball et al. |
| 2003/0145314 A1 | 7/2003 | Nguyen et al. |
| 2003/0204840 A1 | 10/2003 | Wu |
| 2004/0015897 A1 | 1/2004 | Thompson et al. |
| 2004/0015930 A1 | 1/2004 | Wu |
| 2004/0025145 A1 | 2/2004 | Dawson |
| 2004/0078381 A1 | 4/2004 | Blandy et al. |
| 2004/0088699 A1 * | 5/2004 | Suresh .......................... 717/174 |
| 2004/0103401 A1 | 5/2004 | Chilimbi et al. |
| 2004/0103408 A1 | 5/2004 | Chilimbi et al. |
| 2004/0111444 A1 | 6/2004 | Garthwaite |
| 2004/0133556 A1 | 7/2004 | Wolczko et al. |
| 2004/0181782 A1 * | 9/2004 | Findeisen ..................... 717/130 |
| 2004/0215880 A1 | 10/2004 | Chilimbi et al. |
| 2004/0216091 A1 | 10/2004 | Groeschel |
| 2005/0086648 A1 | 4/2005 | Andrews et al. |
| 2005/0091645 A1 | 4/2005 | Chilimbi et al. |
| 2005/0149904 A1 | 7/2005 | Ball et al. |
| 2005/0182603 A1 * | 8/2005 | Freitas et al. ...................... 703/2 |
| 2005/0235257 A1 | 10/2005 | Ball et al. |
| 2005/0246696 A1 | 11/2005 | Alexander et al. |
| 2006/0070040 A1 | 3/2006 | Chilimbi et al. |
| 2006/0155791 A1 | 7/2006 | Tene et al. |
| 2006/0242636 A1 | 10/2006 | Chilimbi et al. |
| 2006/0265438 A1 | 11/2006 | Shankar et al. |
| 2006/0265694 A1 | 11/2006 | Chilimbi et al. |
| 2007/0083856 A1 | 4/2007 | Chilimbi et al. |
| 2007/0169000 A1 * | 7/2007 | Havin et al. ................... 717/130 |
| 2007/0244942 A1 | 10/2007 | McCamant et al. |

OTHER PUBLICATIONS

Easwarman Raman, *Recursive Data Structure Profiling*, Workshops on Memory System Performance, 2005, 10 pages.

Ammons et al., "Exploiting Hardware Performance Counters with Flow and Context Sensitive Profiling", PLDI (Jun. 1997), 12 pages.

Ammons et al., "Improving Data-Flow Analysis with Path Profiles," SIGPLAN '98 (1998), pp. 72-84.

Anderson et al., "Continuous Profiling: Where Have All the Cycles Gone?", ACM (Nov. 1997), pp. 357-390.

Annavaram et al., "Data Prefetching by Dependence Graph Precomputation", IEEE (2001), pp. 52-61.

Arnold et al., "A Framework for Reducing the Cost of Instrumented Code", Rutgers University Technical Report DCS-TR-424 (Nov. 2000), pp. 1-10.

Bacon, "A unified theory of garbage collection," ACM, Oct. 2004, 19 pages.

Bala et al., "Dynamo: A Transparent Dynamic Optimization System", ACM (2000), pp. 1-12.

Balakrishnan et al., "Analyzing Memory Accesses in χ86 Binary Executables", Proc. 13th Intl. Conference on Compiler Construction, LNCS 2985 (Apr. 2004), pp. 5-23.

Ball et al., "Efficient Path Profiling", IEEE (1996), pp. 46-57.

Ball et al., "Generating abstract explanations of spurious counterexamples in C programs," Technical Report MSR-TR-2002-09, 13 pages, Jan. 22, 2002.

Ball et al., "The SLAM project: Debugging system software via static analysis," Jan. 2002, 3 pages.

Ball et al., "Boolean programs: A model and process for software analysis," Technical Report MSR-TR-2000-14, 29 pages, Feb. 29, 2000 (updated Mar. 28, 2000).

Ball et al., "Plymorphic Predicate Abstraction," Technical Report MSR-TR-2001-10, 22 pages, Jun. 17, 2002.

Ball et al., "SLAM and static driver verifier: Technology transfer of formal methods inside Microsoft," Technical Report MSR-TR-2004-08, 20 pages, Jan. 28, 2004.

Berger et al., "Composing High-Performance Memory Allocators", ACM (2001), 11 pages.

Bush et al., "A Static Analyzer for Finding Dynamic Programming Errors," Software: Practice and Experience (2000), pp. 775-802.

Cahoon et al., "Data Flow Analysis for Software Prefetching Linked Data Structures in Java", IEEE (2001), 12 pages.

Calder et al., "Cache-Conscious Data Placement", ACM (Oct. 1998), 11 pages.

Chen et al., "Reducing Memory Latency via Non-Blocking and Prefetching Caches", ACM (1992), pp. 51-61.

Chen, "Using build integrated static checking to preserve correctness invariants," ACM, Oct. 2004, 10 pages.

Chilimbi et al., "Cache-Conscious Structure Definition", *Proceedings of the ACM SIGPLAN '99* (May 1999), 12 pages.

Chilimbi et al., "Cache-Conscious Structure Layout", *Proc. ACM SIGPLAN '99 Conf. on Programming Language Design and Impl.*, (May 1999), 12 pages.

Chilimbi et al., "Dynamic Hot Data Stream Prefetching for General-Purpose Programs", ACM (Jun. 2002), 11 pages.

Chilimbi et al., "HeapMD: Identifying Heap-based Bugs Using Anomaly Detection," ACM (Oct. 2006) 10 pages.

Chilimbi et al., "Low-Overhead Memory Leak Detection Using Adaptive Statistical Profiling", Proc. 11th Intl. Conference on Architectural Support for Programming Language and Operating Systems (ASPLOS), (Oct. 2004), pp. 156-164.

Chilimbi et al., "On the Stability of Temporal Data Reference Profiles", PACT (Sep. 2001), 10 pages.

Chilimbi et al., "Using Generational Garbage Collection to Implement Cache-Conscious Data Placement", Proceedings of the First International Symposium on Memory Management (Oct. 1998), vol. 34(3), pp. 37-48.

Cifuentes, "Structuring Decompiled Graphs," Technical Report May 1994, Faculty of Information Technology, Queensland University of Technology, GPO Box 2434, Brisbane 4001, Australia (Apr. 1994), 15 pages.

Cooksey et al., "A Stateless, Content-Directed Data Prefetching Mechanism", ACM (2002), pp. 279-290.

Cowan et al., "Buffer Overflows: Attacks and Defenses for the Vulnerability of the Decade", DARPA information survivability conference and expo (DISCEX) (2000), pp. 1-11.

Crescenzi at al., "A Compendium of NP Optimization Problems," [Downloaded from the World Wide Web on Dec. 12, 2003], 20 pages.

Dean et al., "ProfileMe: Hardware Support for Instruction-Level Profiling on Out-of-Order Processors", Proc. 30th Annual Intl. Symp. on Microarchitecture (Dec. 1997), 12 pages.

Deaver et al., "Wiggins/Redstone: An On-line Program Specializer", Proceedings of the IEEE Hot Chips XI Conference (Aug. 1999), 29 pages.

Demsky et al., "Automatic Detection and Repair of Errors in Data Structures", Proceedings of 18th ACM SIGPLAN Conference on Object-Oriented Programming Systems, Language and Applications (OOPSLA) (Oct. 2003), pp. 78-95.

Demsky et al., "Role-Based Exploration of Object-Oriented Programs", Proceedings of 24th International Conference on Software Engineering (ISCE) (May 2002), pp. 313-334.
Diwan et al., "Memory-System Performance of Programs with Intensive Heap Allocation," ACM TOCS vol. 13, Issue 3, Aug. 1995, ISSN: 0734-2071, 30 pages.
Dor et al., "Cleanness Checking of String Manipulations in C Programs via Integer Analysis", Proc. 8th Int'l Static Analysis Symposium (Jun. 2001), 19 pages.
Dor et al., "CSSV: Towards a Realistic Tool for Statically Detecting All Buffer Overflows in C", PLDI'03 (Jun. 9-11, 2003), pp. 155-167.
Duesterwald et al., "Software profiling for hot path prediction: Less is more," Ninth International Conference on Architectural Support for Programming Languages and Operating Systems (Nov. 2000), pp. 202-211.
Edwards, "Black-Box Testing Using Flowgraphs: An Experimental Assessment of Effectiveness and Automation Potential", Software Testing, Verification and Reliability, vol. 10, No. 4 (Dec. 2000), pp. 249-262.
Eeckhout et al., "Workload Design: Selecting Representative Program-Input Pairs", Proceedings of the 2002 International Conference on Parallel Architectures and Compilation Techniques (2002), 12 pages.
English et al., "Loge: A self-organizing disk controller," Proc. USENIX Winter 1992 Tech. Conf., San Francisco, pp. 237-251 (Jan. 1992).
Ernst, "Dynamically Discovering Likely Program Invariants", PhD Thesis, University of Washington (Aug. 2000), pp. 1-127.
Evans et al., "Improving Security Using Extensible Lightweight Static Analysis", IEEE Software (Jan./Feb. 2002), pp. 42-51.
Evans et al., "LCLint: A Tool for Using Specifications to Check Code", SIGSOFT Symposium on the Foundations of Software Engineering (Dec. 1994), 10 pages.
Evans et al., "Splint Manual, Version 3.1.1-1", Secure Programming Group, University of Virginia Department of Computer Science (Jun. 5, 2003), 121 pages.
Evans, "Static Detection of Dynamic Memory Errors", SIGPLAN Conf. on Programming Langauge and Design Implementation (May 1996), 10 pages.
Evans, "Using Specifications to Check Source Code", TR-628, MIT Lab for Computer Science (Jun. 1994), 97 pages.
Foster et al., "A Theory of Type Qualifiers", Proc. ACM SIGPLAN '99 Conf. on Programming Language and Design Implementation (PLDI) (May 1999), 12 pages.
Gloy et al., "Procedure Placement Using Temporal-Ordering Information", ACM Transactions on Programming Languages and System, vol. 21 (1999), pp. 111-161.
Gonzalez et al., "Eliminating Cache Conflict Misses Through XOR-Based Placement Functions," ICS 97, 1997, pp. 76-83.
Griffioen et al., "Reducing File System Latency Using a Predictive Approach," Proceedings of the USENIX Summer 1994 Technical Conference on USENIX, 11 pages.
Guyer et al., "An Annotation Language for Optimizing Software Libraries", Proc. Second Conf. on Domain Specific Languages (Oct. 1999), 14 pages.
Halldorsson, "Approximations of Weighted Independent Set and Hereditary Subset Problems", JGAA, vol. 4, No. 1 (Apr. 2000), pp. 1-16.
Hangal et al., "Tracking Down Software Bugs Using Automatic Anomaly Detection", Proceedings of 22nd International Conference on Software Engineering (ICSE) (Jan. 1992), pp. 125-136.
Harris, "Dynamic Adaptive Pre-tenuring", Proceedings of the International Symposium on Memory Management (Oct. 2000), 9 pages.
Hastings et al., "Purify: Fast Detection of Memory Leaks and Access Errors", Proceedings of the Winter 1992 USENIX Conference (1992), 10 pages.
Hatfield et al., "Program Restructuring for Virtual Memory," IBM Sys. J., No. 3, pp. 168-192 (1971).
Hauck, "Configuration Prefetch for Single Context Reconfigurable Coprocessors," in Proceedings of the ACM/SIGDA International Symposium on Field Programmable Gate Arrays (Feb. 1998), pp. 65-74.

Heil et al., "Relational Profiling: Enabling Thread-Level Parallelism in Virtual Machines", *Proc. 33rd International Symposium on Microarchitecture* (Dec. 2000), pp. 1-10.
Hirzel et al., "Bursty Tracing: A Framework for Low-Overhead Temporal Profiling", *4th ACM Workshop on Feedback-Directed and Dynamic Optimization* (Dec. 2001), pp. 1-10.
Hirzel et al., "Understanding the Connectivity of Heap Objects", Proceedings of International Symposium on Memory Management (ISMM) (Jun. 2002), pp. 143-156.
Hollingsworth et al., "MDL: A Language and Compiler for Dynamic Program Instrumentation", *Proc. Of the International Conference on Parallel Architectures and Compilations Techniques* (Nov. 1997), 12 pages.
Hölzle et al., "Reconciling Responsiveness with Performance in Purse Object-Oriented Languages", *ACM Transactions on Programming Languages and Systems* (Jul. 1996), pp. 1-40.
Horning, "The Larch Shared Language: Some Open Problems", Compass/ADT Workshop (Sep. 1995), 16 pages.
Joseph et al., "Prefetching Using Markov Predictors", ACM (1997), pp. 252-263.
Jouppi, "Improving Direct-Mapped Cache Performance by the Addition of a Small Fully-Associative Cache and Prefetch Buffers", IEEE (1990), pp. 364-373.
"JProfiler Manual," ejtechnologies, GmbH (2004), pp. 1-141.
Karlsson et al., "A Prefetching Technique for Irregular Accesses to Linked Data Structures", Sixth International Symposium on High-Performance Computer Architecture (Jan. 2000), 12 pages.
Khurshid et al., "An Analyzable Annotation Language," OOPSLA '02 (Nov. 2002), 15 pages.
Kistler et al., "Automated Data-Member Layout of Heap Objects to Improve Memory-Hierarchy Performance," ACM Transactions on Programming Language and Systems, (2000), 16 pages.
Klaiber et al., "An Architecture for Software-Controlled Data Prefetching", ACM (1991), pp. 43-53.
Kramer, "Examples of Design by Contract in Java Using Contract, the Design by Contract™ Tool for Java™", Object World Berlin '99, Design & Components (May 17-20, 1999), 26 pages.
Kroeger et al., "Predicting Future File-system Actions from Prior Events," Proc. USENIX Annual Tech. Conf., San Diego, pp. 1-10 (Jan. 1996).
Larochelle et al., "Statistically Detecting Likely Buffer Overflow Vulnerabilities", 2001 USENIX Security Symposium (Aug. 2001), 5 pages.
Larus, "Whole Program Paths," SIGPLAN '99 Conference on Programming Languages and Design (May 1999), 11 pages.
Leavens et al., "Enhancing the Pre-and Postcondition Technique for More Expressive Specifications", Proc. World Congress on Formal Methods in the Development of Computing Systems (Sep. 1999), 21 pages.
Leavens et al., "Preliminary Design of JML", Technical Report 98-06v, Iowa State University Department of Computer Science (Jun. 1998-2003; revised May 2003), 94 pages.
Leino, "Checking Correctness Properties of Object-Oriented Programs," Internet, http://research.microsoft.com/leino/paper/1 (Aug. 19, 2002), 49 pages.
Liblit et al., "Distributed Program Sampling," Department of Electrical Engineering and Computer Science, University of California, Berkely, 10 pages.
Luk et al., "Compiler-Based Prefetching for Recursive Data Structures", ACM (1996), pp. 222-233.
McCamant, "Improving Model Checking with Dynamic Points-to Sets," 46 slides presented at MIT on Mar. 7, 2006.
Melski et al., "Interprocedural Path Profiling", University of Wisconsin (Sep. 1, 1998), pp. 1-50.
Microsoft Corporation, "Scalable Program Analysis", Internet, http://research.microsoft.com/spa/ (downloaded on Sep. 5, 2003), 3 pages.
Microsoft, "Static driver verifier—Finding driver bugs at compile-time," <http://www.microsoft.com/whdc/devtools/tools/sdv.mspx>, 2 pages (accessed Apr. 1, 2006).
Mowry et al., "Design and Evaluation of a Compiler Algorithm for Prefetching", ACM (1992), pp. 62-73.

Mowry et al., "Predicting Data Cache Misses in Non-Numeric Applications Through Correlation Profiling", International Symposium on Microarchitecture (1997), 7 pages.

Muchnick et al., "Two Approaches to Interprocedural Data Flow Analysis," Chapter 7 of Program Flow Analysis: Theory and Applications, © 1981 by Prentice-Hall, Inc., pp. 189-233.

Nethercote, "Dynamic Binary Analysis and Instrumentation," Nov. 2004 Ph.D. Dissertation. University of Cambridge.

Nevill-Manning et al., "Identifying Hierarchical Structure in Sequences: A Linear-time Algorithm", Journal of Artificial Intelligence Research (Sep. 1997), 7:67-82.

Palmer et al., "Fido: A Cache that Learns to Fetch," Proc. 17th Int'l Conf. on Very Large Databases, Barcelona, pp. 255-264 (Sep. 1991).

Patterson et al., "Informed Prefetching and Caching," Proc. 15th ACM Symp. on Operating System Principles, Copper Mountain Resort, CO, pp. 79-95 (Dec. 1995).

Petrank et al., "The Hardness of Cache Conscious Data Placement," 29th Annual ACM Symposium on Principles of Programming Languages (2002), 33 pages.

Reps et al., "Precise Interprecedural Dataflow Analysis via Graph Reachability," pp. 49-61, Conference Record of POPL'95: 22nd ACM SIGPLAN-SIGACT Symposium on Principles of Programming Languages, 1995.

Roth et al., "Dependence Based Prefetching for Linked Data Structures", Proceedings of the 8th International Conference on Architectural Support (Oct. 1998), pp. 115-126.

Roth et al., "Effective Jump-Pointer Prefetching for Linked Data Structures", IEEE (1999), pp. 111-121.

Rubin et al., "An Efficient Profile-Analysis Framework for Data-Layout Optimizations", POPL (Jan. 2002), pp. 140-153.

Saavedra et al., "Improving the Effectiveness of Software Prefetching With Adaptive Execution", IEEE (1996), pp. 68-78.

Sastry et al., "Rapid Profiling Via Stratified Sampling", International Symposium on Computer Architecture (2001), pp. 1-12.

Savage et al., "Eraser: a dynamic data race detector for multighreaded programs", ACM Transactions on Computer Systems (TOCS) (1997), 391-411.

Seidl et al., "Segregating Heap Objects by Reference Behavior and Lifetime", 8th Int'l Conf. on Architectural Support for Programming Languages and Operating Systems (Oct. 1998), 12 pages.

Shaham, "Automatic Removal of Array Memory Leaks in Java", (1999), 12 pages.

Srivastava, "ATOM: A System for Building Customized Program Analysis Tools", SIGPLAN '94 Conf. on Programming Language Design and Impl. (May 1994), 25 pages.

Srivastava et al., "Vulcan Binary Transformation in a Distributed Environment", Microsoft Research, MSR-TR-99-76 (Apr. 20, 2001), pp. 1-12.

Staelin et al., "Smart Filesystems," Proc. USENIX—Winter '91, Dallas, TX, pp. 45-51 (1991).

Stoutchinin et al., "Speculative Prefetching of Induction Pointers", Proceedings of 10th International Conference on Compiler Construction (2001), 15 pages.

Tait et al., "Detection and Exploitation of File Working Sets," IEEE, pp. 2-9 (1991).

"Technologies for Measuring Software Performance", Intel Corporation (2003), 4 pages.

Traub et al., "Ephemeral instrumentation for lightweight program profiling", Technical report, Harvard University (2000), pp. 1-13.

Truong et al., "Improving Cache Behavior of Dynamically Allocated Data Structures", PACT (1998), 8 pages.

Ung et al., "Optimising Hot Paths in a Dynamic Binary Translator," in Workshop on Binary Translation, Oct. 2000, pp. 55-65.

Vanderwiel et al., "Data Prefetch Mechanisms", ACM Computing Surveys, vol. 32, No. 2 (Jun. 2000), pp. 174-199.

Wahls et al., "The Direct Execution of SPECS-C++: A Model-Based Specification Language for C++ Classes", Technical Report TR94-02b, Iowa State University Department of Computer Science (Nov. 18, 1994), 52 pages.

Zhou et al., "AccMon: Automatically Detecting Memory-Related Bugs via Program Counter-Based Invariants," Proceedings of 37th International Symposium on Micro-Architecture (MICRO) (Dec. 2004).

Zilles et al., "A Programmable Co-processor for Profiling", Proceedings of the 7th International Symposium on High Performance Architecture (Jan. 2001), 12 pages.

Zorn et al., "A Memory Allocation Profiler for C and Lisp Programs," published Feb. 16, 1988, pp. 1-18.

Ball et al., "Automatic Predicate Abstraction of C Programs," ACM SIGPLAN Notices, vol. 36, Issue 5, pp. 203-213, May 2001.

Bloem et al., "Symbolic Guided Search for CTL Model Checking," 37th Design Automation Conference, 6 pages, 2000.

Boehm, "Two-Level Tree Structure for Fast Pointer Lookup," <http://web.archive.org/web/20021202232247/http://www.hpl.hp.com/personal/Hans_Boehm/gc/tree.html>, 4 pages, archived via Wayback Machine Dec. 2, 2002, retrieved Sep. 13, 2010.

Chen et al., "An Empirical Study on the Granularity of Pointer Analysis in C Programs," Languages and Compilers for Parallel Computing, 15th Workshop, 10 pages, 2002.

Clarke et al., "Predicate Abstraction of ANSI-C Programs Using SAT," Formal Methods in System Design, 25, pp. 105-127, Sep. 2004.

Havelund, "Using runtime analysis to guide model checking of Java programs," Proceedings of the 7th International SPIN Workshop on SPIN Model Checking and Software Verification, pp. 245-264, 2000.

Mock, "Dynamic Analysis from the Bottom Up," Workshop on Dynamic Analysis, pp. 13-16, May 9, 2003.

Mock et al., "Dynamic points-to sets: A comparison wi th static analyses and potential applications in program understanding and optimization," Microsoft Research Technical Report MSR-TR-2001-38, 8 pages, published Mar. 2001.

Mock, "Program Slicing with Dynamic Points-To Sets," IEEE Transactions on Software Engineering, vol. 31, No. 8, pp. 657-678, Aug. 2005.

Ravi et al., "Hints to Accelerate Symbolic Traversal," CHARME'99, LNCS1703, pp. 250-266, 1999.

Visser et al., "Model Checking Programs," Automated Software Engineering, 10, pp. 203-232, 2003.

* cited by examiner

Linked list        Array of lists        List allocated at
                                         multiple sites Data Structure Path Profiling 980

DATA STRUCTURE PATH PROFILING

TECHNICAL FIELD

This invention relates to profiling instrumented programs to observe or optimize program behavior, and more specifically, data structure path profiling.

BACKGROUND

With processor speed increasing much more rapidly than memory access speed, there is a growing performance gap between processor and memory in computers. More particularly, processor speed continues to adhere to Moore's law (approximately doubling every 18 months). By comparison memory access speed has been increasing at the relatively glacial rate of 10% per year. Consequently, there is a rapidly growing processor-memory performance gap. Computer architects have tried to mitigate the performance impact of this imbalance with small high-speed cache memories that store recently accessed data. This solution is effective only if most of the data referenced by a program is available in the cache. Unfortunately, many general-purpose programs, which use dynamic, pointer-based data structures, often suffer from high cache miss rates, and therefore are limited by memory system performance.

SUMMARY

The present technology is directed towards providing data structure path profiling. A method is described for profiling a computer program. The method receives a program binary and creates a modified version of the program binary. The modified version is instrumented so that memory allocator instructions and heap pointer instructions also call a runtime profiler. The modified version is executed causing calls to the runtime profiler. The runtime profiler receives the calls and creates a heap model. The runtime profiler assigns identifiers to data objects, associates data objects with data structure instances, assigns identifiers to data paths traversed through data objects, and counts the number of times identified data paths are traversed.

In one example, identifiers assigned to data objects are prime numbers. In another example, data paths are assigned identifiers. The identifiers are a product of prime numbers assigned to data objects along the data path.

In another example, identifiers are assigned to data objects based on hashing on the heap address of data objects, and data paths are identified by the sum of the data object's identifiers along the path. In yet another example, identifiers are assigned to data paths by exclusive-or-ing the data object identifiers along the path. In another example, a data path is identified as an output from a cyclic redundancy check (CRC) hash, using the heap addresses of data objects along the path as the input parameters to the CRC hash function.

In another example, a pointer dereference from a first data object at one memory allocation site dereferences a second data object at another allocation site. This dereference is indicated in the heap model, as the first and second data objects being part of a same data structure instance. In another example, creating a heap model includes determining that a next data object in a path would create a cycle, and instead of creating a path with the cycle, creating a new data path starting with the next data object.

In another example, the runtime profiler provides a profile output comprising plural data paths through plural data structures. An output of the profiler can be displayed. In another example, a frequently executed data path is identified in the profile output. Logic is created that identifies leading data objects in the frequently executed data path. The logic also prefetches the remaining data objects in the frequently executed data path. The program binary is instrumented with the logic and executed, and during execution, the instrumented program binary prefetches the remaining objects in the frequently executed data path. In another example, information in the profile output is used to drive logic that rearranges a heap to increase spatial locality for data objects in the frequently executed data path.

In yet another example, a computer system provides data structure path profiling, using various system components, such as a central processing unit coupled to memory via a bus. The memory includes various software, such as a program binary and an instrumenting component. The instrumenting component instruments the program binary to make calls to a profiler runtime component. The profiler runtime component builds a heap model responsive to receiving calls from the instrumented program binary. The built heap model includes data objects assigned prime numbers, data objects associated to data structure instances via pointers, and uniquely identified paths through data structures. The uniquely identified paths are uniquely identified by a product of prime numbers assigned to the data objects on the path. In another example, the memory includes a data dynamic prefetch component that identifies leading data objects in a uniquely identified data path, and prefetches the remaining data objects in the uniquely identified data path. In another example, the memory includes a heap component that rearranges a heap to increase spatial locality for data objects in the uniquely identified data path.

In addition to counting instances of data structure paths, the described technology can be used to associate other metrics with data structure paths. For example, such metrics as cache miss rates, page faults, or branch miss predictions can be counted for data paths.

Additional features and advantages will be made apparent from the following detailed description of the illustrated embodiment which proceeds with reference to the accompanying drawings.

DETAILED DESCRIPTION

Figure 1:
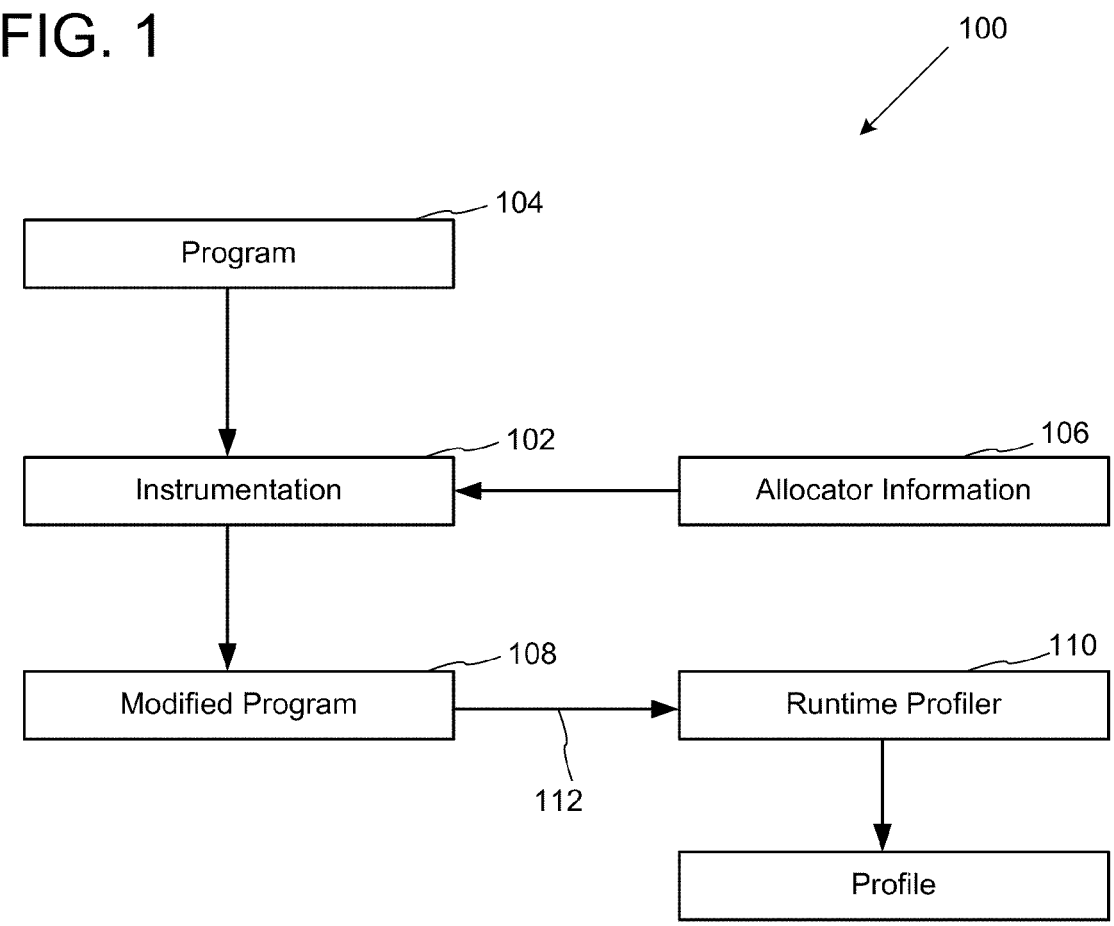
FIG. 1 is a block diagram of an exemplary architecture for data structure path profiling.

In the following detailed description, data structure path profiling is discussed in context with the following associated drawings.

Overview of Data Structure Instance Relative Path Profiling

Programmers typically view a program's data space as a collection of data structures and the program as a sequence of operations on the data structures. However, most memory profiling techniques view the memory as a single entity and are agnostic with respect to the manner in which the data is organized in memory. The described technology proposes a profiling scheme that 1) partitions heap-allocated data objects into data structure instances, and 2) collects data structure path profiles (i.e., profiles of acyclic paths) through individual data structure instances. To track path frequencies, several methods are discussed for mapping data structure paths to numeric identifiers, one based on prime numbers and the other based upon a hash function. In one such example, a cyclic redundancy check (CRC) hashing technique is used. The described technology was tested using benchmarks from the SPEC CPU2000 and Foxpro, a database application. The data structure path profiles were found to reveal interesting properties in data structure instances that can be exploited by memory optimizations.

The memory subsystem is arguably one of the largest performance bottlenecks in modern processor architectures. This problem is aggravated by the ever increasing gap between processor and memory speed coupled with the trend towards more complex, data intensive applications. To address this problem, recent efforts have analyzed a program's dynamic memory behavior and have provided design optimizations that exploit patterns in a data reference stream. A first reference proposes an efficient profiling scheme that stores a program's entire memory reference stream, also referred to as the Whole Data Stream. See Trishul Chilimbi, *Efficient Representations and Abstractions for Quantifying and Exploiting Data Reference Locality*, Symposium of Programming Languages Design and Implementation, 2001. Although the whole data streams are exhaustive, most information of interest to memory optimizations can be extracted from the whole data stream and summarized as hot data streams. See Dynamic Prefetching of Hot Data Streams, U.S. patent application Ser. No. 10/304,306, filed Nov. 25, 2002, which is incorporated herein by reference thereto (referred to hereafter as "Hot Data Streams"). Hot Data Streams refer to a sequence of memory references that occurs frequently. By definition, Hot Data Streams represent parts of the memory reference stream that exhibit high locality and regularity. For instance, in the whole data stream below in Table 1, the sequence <d, a, f> occurs twice in the sequence and is a candidate hot data stream.

TABLE 1

A Whole Data Stream a b c d a f b e d a f g . . .

Instead, this technology proposes an alternative approach for profiling and analyzing data reference streams. Note that while the whole data stream represents the sequence of memory references received by the memory subsystem, programmers typically view memory as a collection of data structures and the program as a sequence of operations on the data structures. In Table 1, the data accesses to data structure instances are interleaved. The access patterns of a specific data structure will appear confounded or commingled in the whole data stream. Table 2 illustrates this scenario. Assume that objects a, c, e and g belong to one data structure (DSI-1) instance and objects b, d and f belong to another (DSI-2). Using the described technology, the data structure relative accesses are split into references belonging to individual data structures.

TABLE 2

Data Structure Reference Streams

DSI-1 {b d f b d f}
DSI-2 {a c a e a g}

In this example, partitioning the data stream into data objects accessed according to data structure instance uncovers access patterns that were not visible in the whole data stream. Thus, in order to characterize the behavior of individual data structure instances and to identify regular access patterns, data paths are identified and profiled through data structure streams. A data structure path is an acyclic sequence of references to a data structure instance; a data structure path terminates when a field of an object is referenced twice along the path. For reasons discussed below, cycles through a data structure instance are converted into discrete data paths. Thus, in one example, cycles through a data structure instances are converted into acyclic paths. Table 3 illustrates how a data structure's reference stream is broken into acyclic paths.

TABLE 3

Data structure paths

|b d f|b d f . . .
|a c|a e|a g . . .

As shown in Table 3, data paths are broken before revisiting a node already in the path (e.g., b or a). In the next section, a profiling scheme is discussed that identifies data structure instances and tracks frequencies of data structure paths.

Profiler Architecture and Operation

FIG. 1 is a block diagram of an exemplary architecture for data structure path profiling. An instrumentation component 102 receives a program 104 (such as a binary file) as input. Optionally, the instrumentation component receives an identification or a description of allocation routines 106 (e.g., such as custom memory allocation routines) used by the program. If memory allocation routines known to the instrumentation component are used by the program, then this description 106 is not necessary. The instrumentation component generates a modified binary 108 in which all loads and stores are instrumented and wrappers are generated for each allocation/deallocation routine. The instrumented/modified binary is then executed.

When the modified binary is executed, a routine 112 in the runtime component is invoked after every allocation/deallocation request. Further, the data structure paths are recorded 112. In turn, the profiler runtime 110 builds a model that stores information about the heap.

Figure 2:
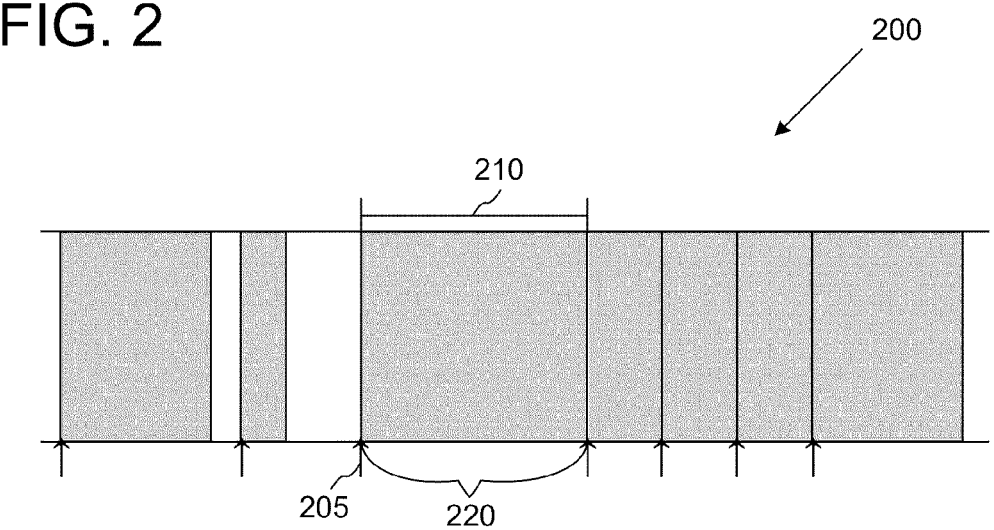
FIG. 2 is a graphical representation of an exemplary model of the heap.

FIG. 2 is a graphical representation of an exemplary model 200 of the heap. For example, the heap model (e.g., table, data structure, etc.) stores information about each object's address 205, size 210 and, and allocation site 220. This information will be used to determine data structure instance relative information. The path profiler runtime 110 also tracks loads from and stores to the heap. Heap stores are classified as a pointer store or an ordinary store. A pointer store is a store whose source value is a valid heap address. Pointer stores are used to determine links between data objects in data structure instances in the heap. The heap model is built as information about data paths through the data structures instances are provided from calls made 112 to the profiler runtime from the executing modified program.

This information provided by the executing modified program is used to construct a Static Shape Graph (SSG). See Easwarman Raman, *Recursive Data Structure Profiling*, Workshops on Memory System Performance, 2005. The SSG is a graph G=(V, E) where V is a set of nodes, one for each allocation site. An edge is created between two nodes A and B of the SSG if a field in any object x allocated at site A points to any object y allocated at site B.

Figure 3:
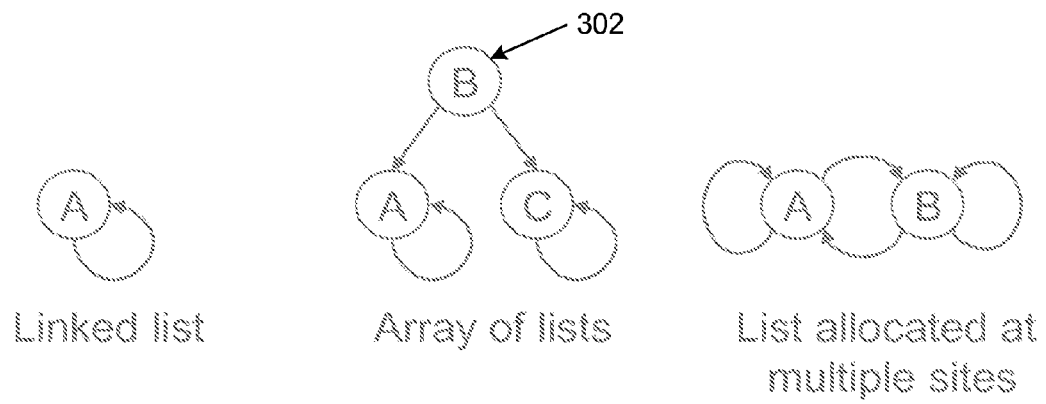
FIG. 3 is a graphical representation of exemplary graph data structures.

FIG. 3 is a graphical representation of a few common graph data structures. Note that strongly connected components in the shape graph indicate the presence of recursive data structures such as linked lists and trees. The profiler runtime uses the SSG to build a model of data structure instances. A node is created for each allocation site in the program 302. An allocation site is a procedure that makes a system call to create heap memory space for the program. Then, when a data object located in one allocation site, dereferences (via pointer) a data object at another allocation site, then an edge or data path is created indicating the same data structure instance. Thus, the profiler tracks allocations and pointer reference at the allocation sites to build up data structure instances. This creates a profile of the data structures and data paths thereof.

Figure 4:
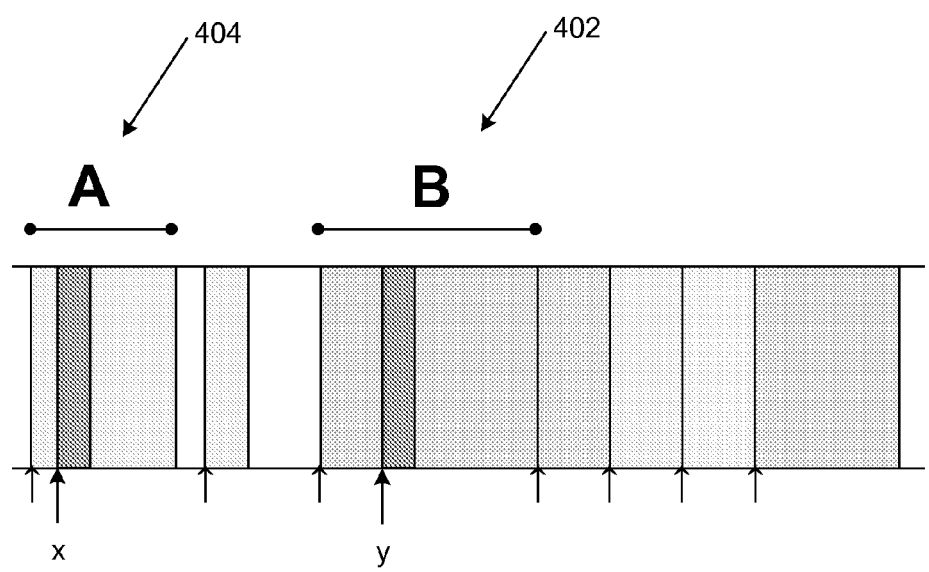
FIG. 4 is a graphical representation of a heap model with plural allocation sites.

FIG. 4 is a graphical representation of a heap model. In a trivial implementation, a profiler could conclude that everything allocated at a certain site 402 is the same data structure. However, sometimes with a linked list or tree, subsequent calls may allocate different parts of the tree at different places 404 on the heap. Yet, they are often the same data structure. Thus, the following three conditions, determine when data objects at different allocation sites are part of the same data structure. It determines this by tracking the pointer accesses across the data allocation sites.

In the model, each data structure instance is represented as a collection of heap objects. Two heap objects x (allocated at site A) and y (allocated at site B) involved in a pointer store (x→ptr=y) are said to be strongly connected and belong to the same data structure instance if any of the following three conditions hold:
  1) x and y are allocated at the same site i.e. A=B or,
  2) B does not allocate a recursive data structure i.e. there are no strongly connected components in the SSG that include B or,
  3) A and B are part of at least one strongly connected component in the SSG.

If any one of these conditions hold, data structure instances of x and y are merged into one data structure instance. This is important because a data structure path that traverses x and y, are then profiled as a path through a same data structure instances. In the absence of type information, the profiler approximates types using allocation sites (e.g., A and B in FIG. 4). If the first condition is true, the linked objects have the same type and hence belong to the same instance. The second and third conditions ensure that if allocation site B is known to allocate recursive data structure instances, those instances are profiled as independent data structure instances, unless objects allocated at A and B are tightly coupled.

Identifying Paths for Data Path Profiling

One of the main problems in software development is that increases in memory speeds are not tracking increases in processor speeds. Whenever data is accessed from memory, the memory fetch can take a long relative time if the data is not in the cache. This results in a performance bottleneck for a program unable to provide data and instructions from memory as fast as required by processors.

One possible benefit of data structure path profiling is to provide the programmer with information about what data paths are slowing down their program. Previous work has been focused on individual data accesses without considering what data structures are performing poorly. Thus, one of the contributions of data structure path profiling is that it provides information about data accesses based on data structure instances. In one example, this data structure access relative information is exposed to a programmer so they can make decisions about which data structures may require more efficiency. For example, if the technology provides a repeated access pattern through a tree data structure that is inefficient, a programmer has useful information that can be used to change the program code or data structures. An algorithm accessing the data structure or the data structure itself can be changed to provide a more efficient program.

The technology can further be considered using an analogy between data structures and program code. People have profiled program code for some time. For example, if certain program code branches are executed, then a certain path through the program code is executed. Profiling will show which paths through the program code are traveled most frequently and a programmer can focus on improving efficiencies in the most frequented program code. Instead, this technology profiles data paths through data structure instances, and the paths most frequented data paths or program code accessing them can be considered for efficiency. However, the same techniques for profiling program code can not be used in profiling data structure paths. Program code for most applications is static. Rarely is program code self modifying. Additionally, an executing program does not delete program code. Whereas, data structures (and paths through them) are allocated and deleted dynamically, and pointers are changed to point from one data structure element to another (e.g., nodes in a graph, list, tree, etc.). This dynamic behavior is generally not seen in program code. The heap and data structures are much more dynamic and changing, whereas program code is known and remains static. These fundamental differences prohibit using techniques used to profile program code.

Additionally, there is a unique way of naming or identifying program code. For example, a path through a series of basic blocks can be identified by the program counter, whereas the heap objects are dynamically changing. So it is not clear how to consistently identify data objects within a dynamic data structure. One possibility is to use the address of data objects within a data structure on the heap, but that may change from one run to the next run, or it may change when the heap is reorganized during garbage collection. Additionally, it would be desirable to identify or name paths through data structures in a scalable way. It would be desirable to uniquely identify a path through a data structure. It would also be desirable to associate some metric with a path through a data structure, such as a metric of the number of times the uniquely identified path is traveled. If a path through a set of nodes in a data structure is traveled many times, then this information is useful for various purposes, such as improving program runtime efficiency or improving programmer understanding of a selected data structures effect on efficiency.

If a path through a data structure on the heap is identified by concatenating the addresses where the accessed path nodes are located, then the concatenated path identification will quickly become very large and unmanageable. Thus, it would be preferable to provide a concise way of naming unique paths in data structures, that is scalable in some sense, and that can tolerate the fact that a program inserts and deletes nodes within data structures during execution.

Several methods are provided for uniquely naming paths of nodes through data structures. The first technique assigns a unique prime number to each node within a data structure, the second method uses a hash function, and a third uses a CRC hash function.

Figure 5:
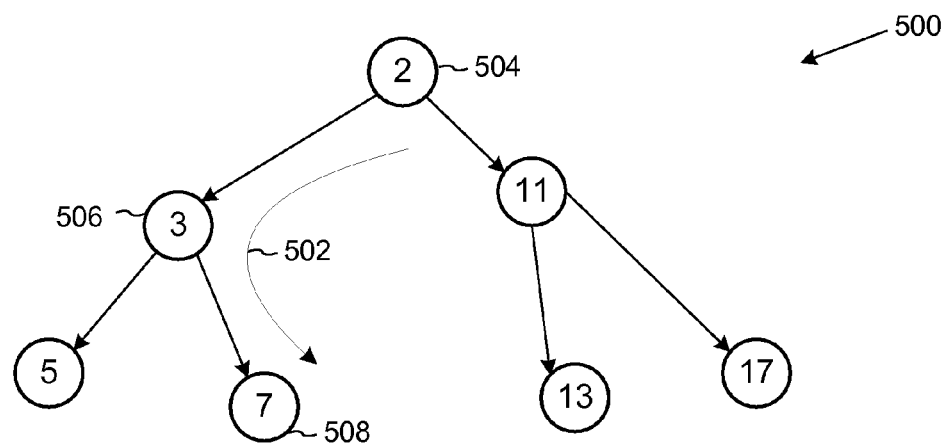
FIG. 5 is an exemplary data structure with prime numbers assigned to each data object within the data structure.

FIG. 5 is an exemplary data structure with prime numbers assigned to each data object within the data structure. In this example, each node (e.g., data object) of a tree data structure is assigned a prime number (e.g., 2, 3, 5, 7, 11, 13, 17, . . . ) that uniquely identifies that node. Additionally, a path through nodes is uniquely identified by the product of the prime numbers assigned to the nodes on the path. In FIG. 5, each node of the tree data structure is assigned a unique prime number. When a key field in a data structure is accessed along a data path 502, that access is identified by multiplying the primed numbers assigned to the data objects along the accessed path. In this example, a metric indicates that the path 2×3×7, or path "42" was accessed. Because of the nature of prime numbers, a given path always ends up with a unique product (e.g., 42). Further, since there is only one way to factor 42 back into prime numbers, the data objects of the path may also be uniquely identified, if desirable for any reason. Thus, the value 42 can be used in a path frequency analysis to uniquely identify a path. And, given only the path value (e.g., 42) the nodes can be obtained by the unique factoring of primes to produce the uniquely named data objects in the path 2, 3, and 7.

Potentially, there is an infinite number of data access paths for a given data structure, but in practice, a program typically only executes a small fraction of the potential paths through a data structure. And of those, even fewer are typically executed with any frequency. And further, of those paths executed, it may only be interesting to know the frequency of the top ten paths executed. For example, in a prefetch scheme, prefetching data objects from the top percentage of the data paths may increase performance demonstrably. If certain data paths dominate in terms of execution frequency, this information is efficiently provided using the described prime numbers, a hash function, or a CRC hash function; along with their associated unique data path identifiers.

One of the problems with this first solution (prime numbers), is that with very large data structures, the product of these primes grows very rapidly. For example, if the path of data objects is one hundred elements long, the product of the primes could grow beyond resource capacity, or beyond efficient time considerations. Although multiplication is very efficient on processors, overflow may eventually result. In such cases, a modulo system can be used to cycle through the overflow cases. Or, in another example, after the maximum indicated prime number is assigned to a node, the method begins aliasing by starting from the lowest prime number again. In some cases, while using these methods of dealing with overflow, a program may end up with aliasing of data path values. However, this is quite rare in practice. Not only must a data object be assigned a same prime number, but a path through that alias must coincide with the product of some primes, which is even more unlikely. Thus, for the most part, data paths are still uniquely identified. In a moment, the discussion will turn to a method of uniquely identifying paths using a hash function or a CRC hash function, but first a method is discussed for uniquely identifying data paths through cyclic data structures.

Figure 6:
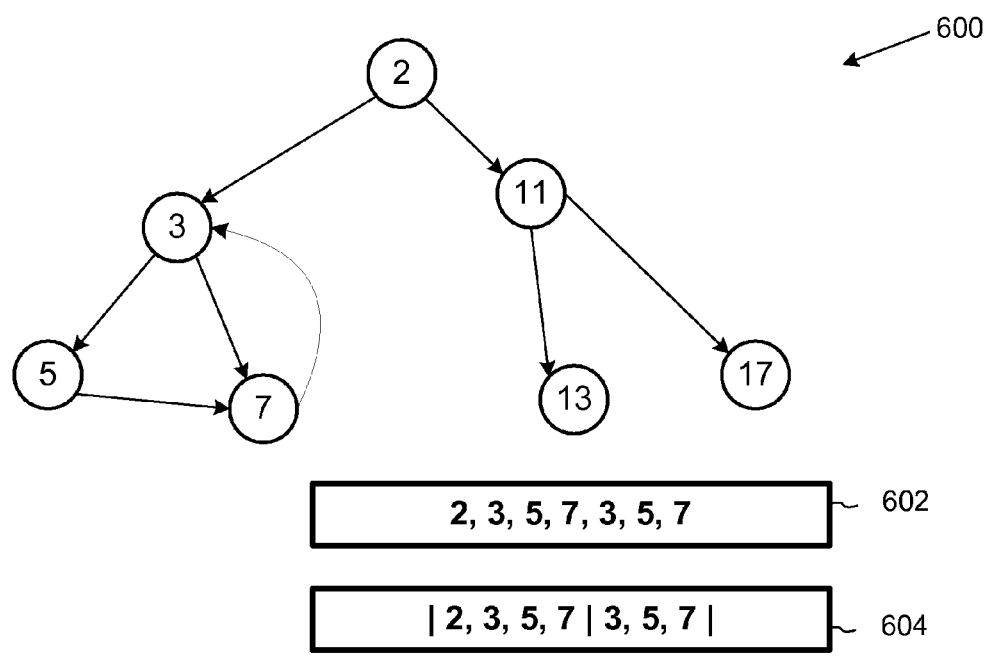
FIG. 6 is an exemplary data structure instance with data paths that include cycles.

FIG. 6 is an exemplary data structure instance with data paths that include cycles. In the case of a runtime path through a data structure instance 600 that includes cycles 602, those paths are broken into separate paths. In this example, a path 602 ends at the node "7". Since the next pointer dereference would create a cycle back through 7, the data path is split into two paths. Then, a metric is kept separately for these two paths. Notice that before a cycle, each of the paths 604, remains uniquely identifiable by the product of its prime numbers, without renaming the nodes themselves. Whether a data structure instance is acyclic or cyclic, the number of times a path is taken is counted, and that count is associated with the unique path identifier. The path through a data structure instance is assigned a metric that indicates how many times that path through the data structure instance was traversed while executing the modified binary 108.

Another way to identify paths is to use a hash function. For example, a method takes the heap address of a data object and hashes on that heap address to obtain a hash output value. Each accessed data object of the data structure instance is assigned its hashed address value. Then, the path of the accessed objects is identified as the sum of the hash values of the data object on that path. When a path through a data structure sums to the same value, it is counted as the same path. In another example, the hash values are XOR'd (exclusive or) together instead of summed. If the XOR'd values of two paths are the same, then they are counted as the same data path. The downside of using a hashing method instead of the prime number method is that the summed hash values can not be factored into the corresponding prime numbers. Thus, the hash sum can not be reliably decomposed or factored back to identify the data object in the data path. Thus, the hash method is limited to providing profiling information.

In another example, a CRC hash method was found to be efficient. For example, instead of hashing on the object addresses and summing (or XOR-ing) the hash outputs, a CRC hash takes the heap object addresses along the path as input parameters and outputs a single hash value for the path identifier.

Thus, prime numbers or hashing can be used to determine path identifiers. During a program profiling phase, a program is instrumented to identify and count the number of times paths through objects of a data structure instance are taken by an executing program. This path information is provided to a programmer or used in other ways to make the program more efficient.

Profiler Evaluation

Figure 7:
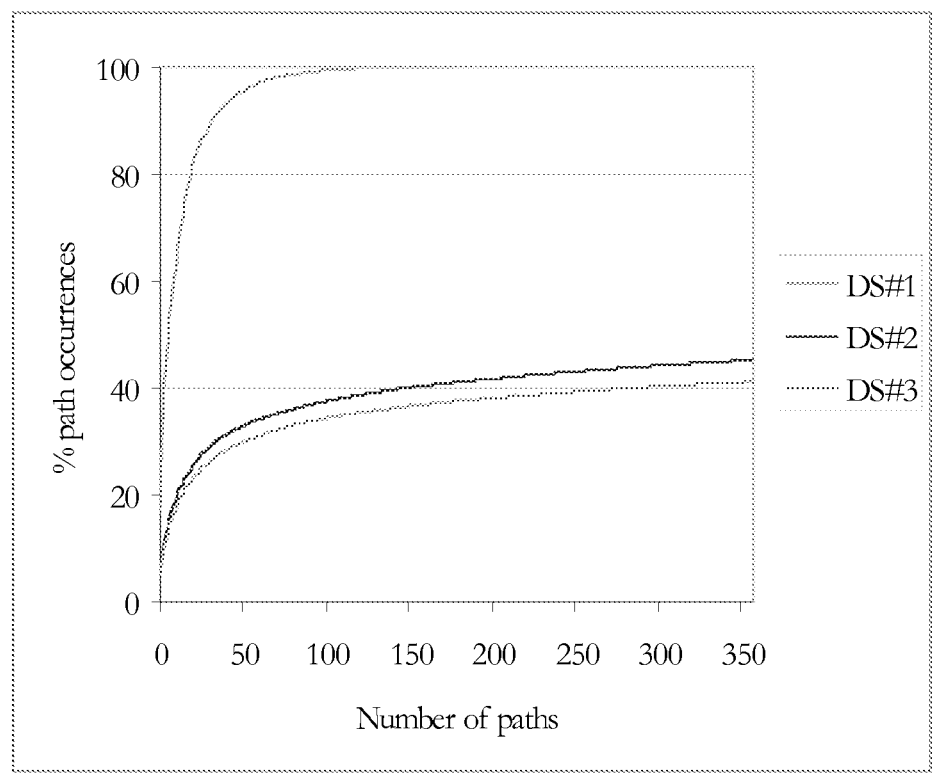
FIG. 7 is a graph of a percentage of path occurrences versus number of paths.

FIG. 7 is a graph of a percentage of path occurrences versus number of paths. The y axis represents the number of times a unique path through a data structure instance is traversed, as normalized across the total and provided as a percentage. The profiling scheme was evaluated using heap-intensive benchmarks from the SPEC CPU2000 suite and two proprietary benchmarks, Foxpro and Microsoft Encarta. The benchmarks were compiled using Microsoft's C/C++ compiler using SPEC specified optimization flags. Timing measurements were taken on an Intel Pentium 4 3.2 GHz dual processor with 1 GB RAM using a timing utility ntimer. The graph provides information about three data structure instances (DS#1, DS#2, and DS#3). Notice that in DS#1, almost 90% of the path occurrences occur in about 25 paths. This information is valuable to a programmer, because a fewer number of paths that are executed a higher percentage of the time, provided a target for improving efficiency. For example, the programmer could improve the program code accessing the data structure, or provide an alternate data structure that would access the data in this path more efficiently. From an optimization perspective, these few paths are traversed so many times, they can be used to set-up prefetching schemes. From a garbage collector efficiency perspective, these paths can also be used to provide better data spatial locality during garbage collection (e.g., heap compacting, etc.). Of course, the graph is merely one possible way to display the collected metrics. This information may also be provided in a data format to a programmer, to a dynamic prefetch routine, or to a garbage collector for reorganizing the spatial locality of the heap. If the behavior is stable across plural runs, then the data path objects can be allocated near each other on the heap. This will increase data locality which may reduce the requirements for both garbage collection and prefetch techniques.

Using Profiled Data Paths

There are several ways to use this data structure instance data path information. First, provide the information to a programmer developing the program or testing. A programmer may determine, for instance, that a linked list may be more efficient than a tree for certain high frequency data paths through a data structure. Second, the path information can be used to provide dynamic prefetch of hot data paths. See above, Hot Data Streams. Once a prefix is seen, based on the high frequency information, there is a high possibility that prefetching the suffix of the path will provide efficiencies. Third, the data objects in the high frequency data paths of the data structure instance can be arranged with high spatial locality in memory and or cache during memory allocation. See e.g., Cache Conscious Coallocation of Hot Data Streams, U.S. patent application Ser. No. 10/737,205, filed Dec. 15, 2004, which is incorporated herein by reference thereto (referred to hereafter as "Cache Conscious"). That is, as these hot path data objects are allocated, they can be allocated with high proximity of spatial locality in memory. Fourth, during garbage collection, this information can be used to pack high frequency data path objects near each other when the heap is garbage collected. Combinations of these uses are also possible. Consider two high frequency data paths that will not fit on a memory page or segment. In such a case, one path can be used to provide high data locality by placing them on the same page, and another path can brought in using a dynamic prefetch strategy as necessary.

Hot Data Streams profiled frequently accessed sequences of data. But these Hot Data Streams had no concept of what data structures the data was accessed from. For example, a single hot data stream could access data in one, ten or twenty data structures, and it made no determination, distinction, or use of that information. Hot Data Streams did not relate back to paths through data structures instances. Thus, a hot data stream is helpful for prefetching data from various sources dynamically. But this low level information did not provide, for example, a programmer with data structure information or data structure path access information. Thus, the present specification profiles data access information in terms of data structures and paths through data structures.

Often, when a path is traversed 502 through a data structure instance, one object 504 is dereferenced in order to obtain a pointer to another object 506. This dereference information provides a data access path 502, and an indication that the two data objects are part of the same data structure instance 500. It is important to note that data path profiling information can be used to prefetch data path objects using the dynamic prefetch technology discussed in Hot Data Streams. The difference is that the data path information is used as input to the prefetch routine instead of the pure data access information used in Hot Data Streams. In some cases, prefetching of Hot Data Streams provides a more efficient solution, while in other cases, prefetching hot data paths is more efficient. In general, the longer the data paths through a data structure instance, the more efficient the data path information will be for the above stated purposes. On the other hand, short data paths, possibly across many data structures, may indicate greater efficiency using prefetching of Hot Data Streams.

In another example, a garbage collector can use data access and/or data path profile information to provide efficient heap management. A garbage collector has access to such information as hardware performance counters, which indicate paging activity, cache miss rates, etc. In one example, a garbage collector starts using Hot Data Streams to profile for data accesses to identify heap addresses for increasing data locality. The garbage collector then measures cache miss rates. If the cache miss rates do not drop significantly using Hot Data Streams, then the garbage collector implements the present technology and dynamically prefetches hot data paths. Of course, the dynamic prefetching technique discussed in Hot Data Streams can be used to prefetch a hot data path, when a prefix of hot data path objects is encountered.

Similarly, if the described technology is implemented by the operating system (OS), the OS can track page faults while implementing Hot Data Streams. If the page fault rate does not reduce significantly, then data path profiling and prefetching can be used instead. Of course, the Hot Data Streams functionality can also be a feature or component of a program, and as such can Hot Data Steam profile, hot data path profile, and prefetch according to whichever provides the lowest cache miss rates.

In several examples, data path profiling was discussed in terms of graphs and trees. However, the described technology applies to any data structure with data objects connected by pointers, such as a graph, tree, linked list, or any other data structure connected by pointers. And any path that has a cycle, is broken into two paths, where the existing path ends in the last node before a cycle is created, and the next path begins with the node where the cycle would have begun.

A data path can be provided to a programmer. For example, the programmer can be provided with the program counter from where a data object in a path is called along with the data structure called, and the possibly the data object called in that data structure. In another example, the source code that called the data objects in the path is provided to the programmer, as well as an identification of the data structure and path accessed by the source code. This information directs the programmer to a high frequency section of program code (e.g., source code) where improvements can be considered.

Empirically, the hot data paths created by the described technology are observed to be longer in length than the data streams observed using Hot Data Streams; and this makes sense. A hot data stream included accesses across many data structures, stack, heap, etc. If one of the streams had just one data access that was out of place with respect to a profiled "hot steam" it was not seen as the same stream. But when data accesses are split according to paths through data structure instances, then a data access inconsistent with a "hot data path" for a specific data structure instance is filtered out; leaving only data object accesses relative to the same data structure. Thus, because data paths are filtered per data structure instance, an access outside that data structure will not interrupt identification of a path through the data structure.

Profiling Allocations, Pointer Writes, and Pointer Reads

The profiling method profiles pointer writes and pointer reads. Thus, given a data object A, that points to data object B, the profiling method records the information that B was accessed/dereferenced via A. This is also part of a data path. Thus, when an object is loaded into memory, if a pointer was used to identify that object, then a data path is being recorded. Thus, the binary code of a program is instrumented so that instructions that dereference a pointer, provide information to build a model of a data path.

The instrumented code calls a method that records the calling data objects heap address, and the called data objects heap address. A prime number is assigned to the new object (or a hash is performed on the heap address of the new object). Then, for this path, the product of primes is computed (or the CRC hash is computed on the path of addresses).

Later, if instrumented code calls with a same heap data object address already assigned a prime number (or an already hashed heap address), the model determines that a path must be broken and a new one started.

Thus, the method does not provide a complete graph of the program data structures. Rather, the instrumented allocation routines and pointer dereferences drive data collection of only those data paths taken in only those data structures that are allocated or dereferenced by the instrumented program. If a data structure path is executed by the program, the path data is collected. If the path is not executed, then no data is collected. This provides scalability. Only the portions accessed are documented and frequency information is provided based on how many times it is accessed.

For example, for a tree data structure, traversal always starts at the root. The path would run down the tree from the root, and only those portions accessed would be provided in the model, with corresponding frequency information indicating how many times that path was accessed.

Additionally, memory allocation is instrumented. When memory is allocated on the heap, this is often memory likely to be a data structure instance. The data stream is partitioned based on data objects. As shown in FIG. 1, allocator information 106 is provided to the instrumentation component 102. For example, a command file can list the procedures in the program binary 104 that are not in the standard allocator library. For example, if a program allocates 1 MB of memory and then starts dereferencing that memory, the profiler may have trouble partitioning that memory into nodes. Thus, the custom procedures that allocate memory and the custom procedures that partition the memory into nodes, are identified by the programmer 106 for instrumentation. Then, the wrappers will instrument these procedures and make the required calls into to profiler runtime when the modified program executes.

It may be inefficient and unnecessary to profile an entire program run. Thus, the profiling can be conducted in bursts of temporal profiling by the modified binary, dispersed with periods running the original (un-instrumented) binary of the program under profile. See e.g., Dynamic Temporal Optimization Framework, U.S. patent application Ser. No. 10/305, 056, filed Nov. 25, 2002, incorporated herein by reference thereto (referred to hereafter as "Temporal Optimization").

The data path profiling technique works for general-purpose programs, including pointer-chasing code written in weakly-typed languages, such as C and C++.

Profiling Method

Figure 8:
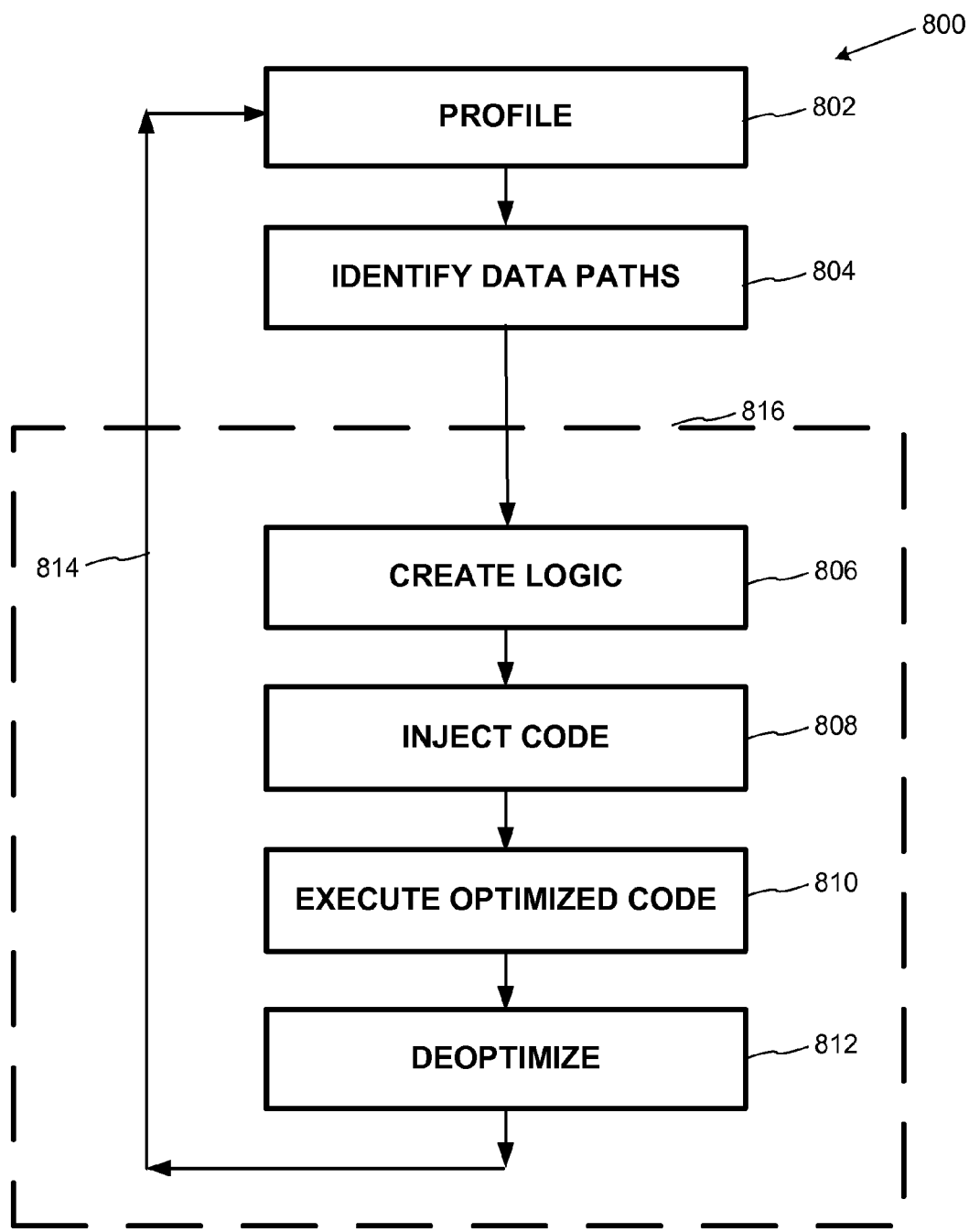
FIG. 8 is a flow chart for a method performing data structure data path profiling.

FIG. 8 is a flow chart for a method performing data structure data path profiling. As indicated by the dotted lines, the profiling and identification of hot data paths provides the steps for obtaining hot data path information 802, 804. Optionally 816, the information can be used for dynamic prefetching, garbage collection, programmer efficiency considerations, etc.

At 802, a profiling phase gathers a temporal data reference profile from a running program, possibly with low-overhead such as Temporal Optimization. Next, the profiling is turned off.

At 804, a fast analysis algorithm extracts hot data paths from the profiling information. The hot data paths are paths through data structure instances that are frequently accessed. High frequency data paths are generally profiled even when the profiler does not run continuously during modified binary execution. This hot data path information can be provided to a programmer, or to a dynamic optimization routine.

Notice that steps 802 and 804 can occur concurrently, for example, if the running program is instrumented with program code that calls a profiling function that extracts the hot data paths at runtime.

Optionally at 806, logic or code is created 806, which identifies a hot data path prefix, and fetches the corresponding hot data path suffix. For example, if the first few data objects in a hot data path are identified during execution, the logic prefetches the balance of that hot data path, as described in Hot Data Streams. The system dynamically injects the created code 808 at appropriate program points to detect and prefetch these hot data paths. The process then enters the hibernation phase where no profiling or analysis is performed, and the program continues to execute 810 with the injected prefix detection and prefetch instructions. Finally, the program is de-optimized 812 to remove the dynamically injected code, and if desired, control returns to the profiling phase 802. For long-running programs, this cycle will repeat 814, possibly multiple times.

The technology performs well in a dynamic framework for runtime detection of hot data paths and demonstrates that this can be accomplished with extremely low-overhead. Rather than identifying and collecting the trace of all data paths, the dynamic framework uses sampling to collect a temporal data path profile. This is accomplished as discussed in Temporal Optimization.

Generally it is more efficient to prefetch only the high frequency data paths, since the overhead of profiling and prefetching is repaid more quickly in the hot data paths. However, a feedback loop of the cache miss rate can be used to find the most efficient level of hot data path prefetching. For example, a prefetch strategy may start with only those data paths found to be utilizing the top 50% of resources, and then use feedback loop to determine whether to increase or decrease the data paths prefetched. Additionally, the deterministic finite state machines described in Hot Data Streams can be used to detect and prefetch hot data paths.

Using Prime Number, Hash, or CRC Hash

As previously stated, if the prime number node identification method is used, the path identifier (e.g., the product of primes) can be factored to determine the nodes in the hot data path. However, the specific nodes in the path can not necessarily be determined by the hash or CRC hash methods. In practice, two methods can be used to increase efficiency in certain cases.

In a first phase, a hash or CRC hash method is used to identify data structure instances with high frequency data paths. Then, during a second phase, the prime number method is used but only for those data structures indicated in the first phase, to have high frequency data paths. Thus, iteration 1 is used to identify interesting data structure instances, and the paths are identified with the prime number scheme in phase 2. Because the hash or CRC hash methods are faster and will not overflow, it is best to identify the highest frequency data structures program wide. But once those data structures are identified, the prime number method is less likely to overflow, and will help identify data objects in the hot data paths.

Computing Environment

Figure 9:
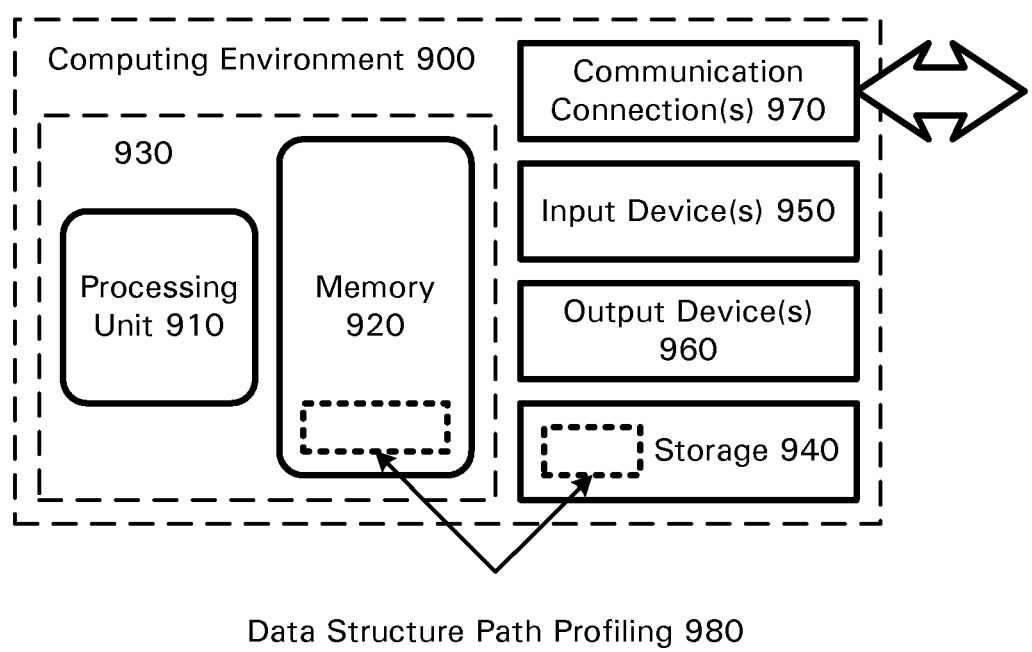
FIG. 9 is a block diagram of a computer system that may be used to implement a method, apparatus, or system embodying data structure path profiling.

FIG. 9 illustrates a generalized example of a suitable computing environment 900 in which the described techniques can be implemented. The computing environment 900 is not intended to suggest any limitation as to scope of use or functionality of the invention, as the present invention may be implemented in diverse general-purpose or special-purpose computing environments.

With reference to FIG. 9, the computing environment 900 includes at least one processing unit 910 and memory 920. In FIG. 9, this most basic configuration 930 is included within a dashed line. The processing unit 910 executes computer-executable instructions and may be a real or a virtual processor. In a multi-processing system, multiple processing units execute computer-executable instructions to increase processing power. The memory 920 may be volatile memory (e.g., registers, cache, RAM), non-volatile memory (e.g., ROM, EEPROM, flash memory, etc.), or some combination of the two. The memory 920 stores software 980 implementing the components of FIG. 1.

A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which can be used to store information and which can be accessed within the computing environment 900. The storage 940 stores instructions for Data Structure Path Profiling 980.

The input device(s) 950 may be a touch input device such as a keyboard, mouse, pen, or trackball, a voice input device, a scanning device, or another device that provides input to the computing environment 900. For audio, the input device(s) 950 may be a sound card or similar device that accepts audio input in analog or digital form, or a CD-ROM reader that provides audio samples to the computing environment. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The device connectivity and messaging techniques herein can be described in the general context of computer-readable media. Computer-readable media are any available media that can be accessed within a computing environment. By way of example, and not limitation, with the computing environment 900, computer-readable media include memory 920, storage 940, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method for profiling computer programs comprising:
receiving a program binary;
creating a modified version of the program binary comprising instrumenting memory allocator instructions and heap pointer instructions with runtime call instructions to a runtime profiler;
executing the modified version comprising executing the runtime call instructions; and
responsive to receiving the runtime call instructions at the runtime profiler, creating a heap model comprising,
assigning identifiers to data objects, wherein assigning identifiers to data objects comprises assigning prime numbers to data objects,
associating data objects with data structure instances,
assigning identifiers to data paths traversed through data objects, wherein assigning identifiers to data paths traversed through data objects comprises determining a product of prime numbers assigned to data objects on the data path, and
counting a number of times identified data paths are traversed.

2. The method of claim 1 wherein assigning identifiers to data paths comprises assigning the product of prime numbers as an identifier of the data path.

3. The method of claim 1 wherein creating a heap model further comprises determining that a pointer dereference from a first data object at one memory allocation site dereferences a second data object at another allocation site, and indicating in the heap model, that the first and second data objects are part of a same data structure instance.

4. The method of claim 1 wherein creating a heap model further comprises determining that a next data object in a path would create a cycle, and responsive to the determination creating a new data path starting with the next data object.

5. The method of claim 1 wherein the runtime profiler provides a profile output comprising plural data paths through plural data structures.

6. The method of claim 5 further comprising displaying at least a portion of the profile output.

7. The method of claim 5 further comprising:
from information in the profile output, identifying a frequently executed data path;
creating program logic that,
identifies leading data objects in the frequently executed data path, and prefetches the remaining data objects in the frequently executed data path;
instrumenting the program binary with the created program logic; and
executing the instrumented program binary comprising prefetching the remaining objects in the frequently executed data path.

8. The method of claim 5 further comprising:
from information in the profile output, identifying a frequently executed data path; and
executing program logic that rearranges a heap to increase spatial locality for data objects in the frequently executed data path.

9. The method of claim 1 wherein:
assigning identifiers to data objects comprises assigning identifiers to the data objects on the heap of the executing modified version of the program;
associating data objects with data structure instances comprises associating the data objects on the heap of the executing modified version of the program with data structure instances based on pointers that determine links between the data objects on the heap that comprise the data structure instances;
assigning identifiers to data paths traversed through data objects comprises assigning identifiers to data paths comprising acyclic sequences of references to the data objects on the heap associated to the data structure instances; and
counting the number of times identified data paths are traversed comprises counting the number of times the identified data paths through the data objects on the heap, which are associated with the data structure instances, are traversed during the execution of the executing modified version of the program.

10. A computer system providing data structure path profiling, the system comprising:
a central processing unit coupled to memory via a bus;
in memory, software comprising:
a program binary;
an instrumenting component for instrumenting the program binary to make calls to a profiler runtime component;
the profiler runtime component for building a heap model responsive to receiving calls from the instrumented program binary; and
the built heap model comprising;
data objects assigned prime numbers;
data objects at different memory allocation sites on the heap associated to data structure instances via pointers that determine links between the data objects, wherein the data structure instances comprise the data objects associated to the data structure instances;
uniquely identified paths through the data structure instances, wherein the uniquely identified paths comprise acyclic sequences of references to the data objects associated to the data structure instances, and further comprise unique identifiers comprising products of prime numbers assigned to the data objects on the uniquely identified paths.

11. The computer system of claim 10 wherein the in memory software further comprises a data dynamic prefetch component that identifies leading data objects in a uniquely identified data path, and prefetches the remaining data objects in the uniquely identified data path.

12. The computer system of claim 10 wherein the in memory software further comprises a heap component that rearranges a heap to increase spatial locality for data objects in the uniquely identified data path.

13. A computer readable storage medium comprising computer executable instructions for performing a method comprising:
receiving a program binary;
creating a modified version of the program binary comprising instrumenting memory allocator instructions and heap pointer instructions with call instructions to a runtime profiler;
executing the modified version comprising executing the runtime call instructions; and
responsive to receiving the runtime call instructions at the runtime profiler, creating a heap model comprising:
assigning identifiers to data objects;
associating data objects with data structure instances, wherein creating the heap model further comprises determining that a pointer dereference from a first data object at one memory allocation site dereferences a second data object at another allocation site, and indicating in the heap model, that a same data structure instance comprises the first and second data objects;

assigning identifiers to data paths traversed through data objects; and counting the number of times identified data paths are traversed.

14. The computer readable storage medium of claim 13 wherein the computer executable instructions for assigning identifiers to data objects includes assigning prime numbers to data objects.

15. The computer readable storage medium of claim 13 wherein the computer executable instructions for assigning identifiers to data paths comprises determining a product of prime numbers assigned to data objects on the data path, and assigning the product of prime numbers as an identifier of the data path.

16. The computer readable storage medium of claim 13 wherein the computer executable instructions for assigning identifiers to data paths comprises hashing on heap addresses of data objects along a path.

17. The computer readable storage medium of claim 13 wherein the computer executable instructions for assigning identifiers to data paths comprises determining a sum of the data object's identifiers along the path.

18. The computer readable storage medium of claim 13 wherein identifiers assigned to data objects comprise an identified object's heap address, and identifiers of data paths comprise outputs of a cyclic redundancy check hash using the identifiers of data objects along a path as inputs to the cyclic redundancy check hash.

19. The computer readable storage medium of claim 13 wherein identifiers assigned to data objects comprise a hash output using a data object's heap address as input to the hash, and identifiers of data paths comprise a sum of the data object identifiers along a path.

20. The computer readable storage medium of claim 13 wherein identifiers assigned to data objects comprise a hash output using a data object's heap address as input to the hash, and identifiers of data paths comprise an exclusive OR of data object identifiers along a path.

* * * * *